Oct. 13, 1942.  J. L. RAY  2,298,310
HYDRAULIC DRIVE
Filed April 20, 1940
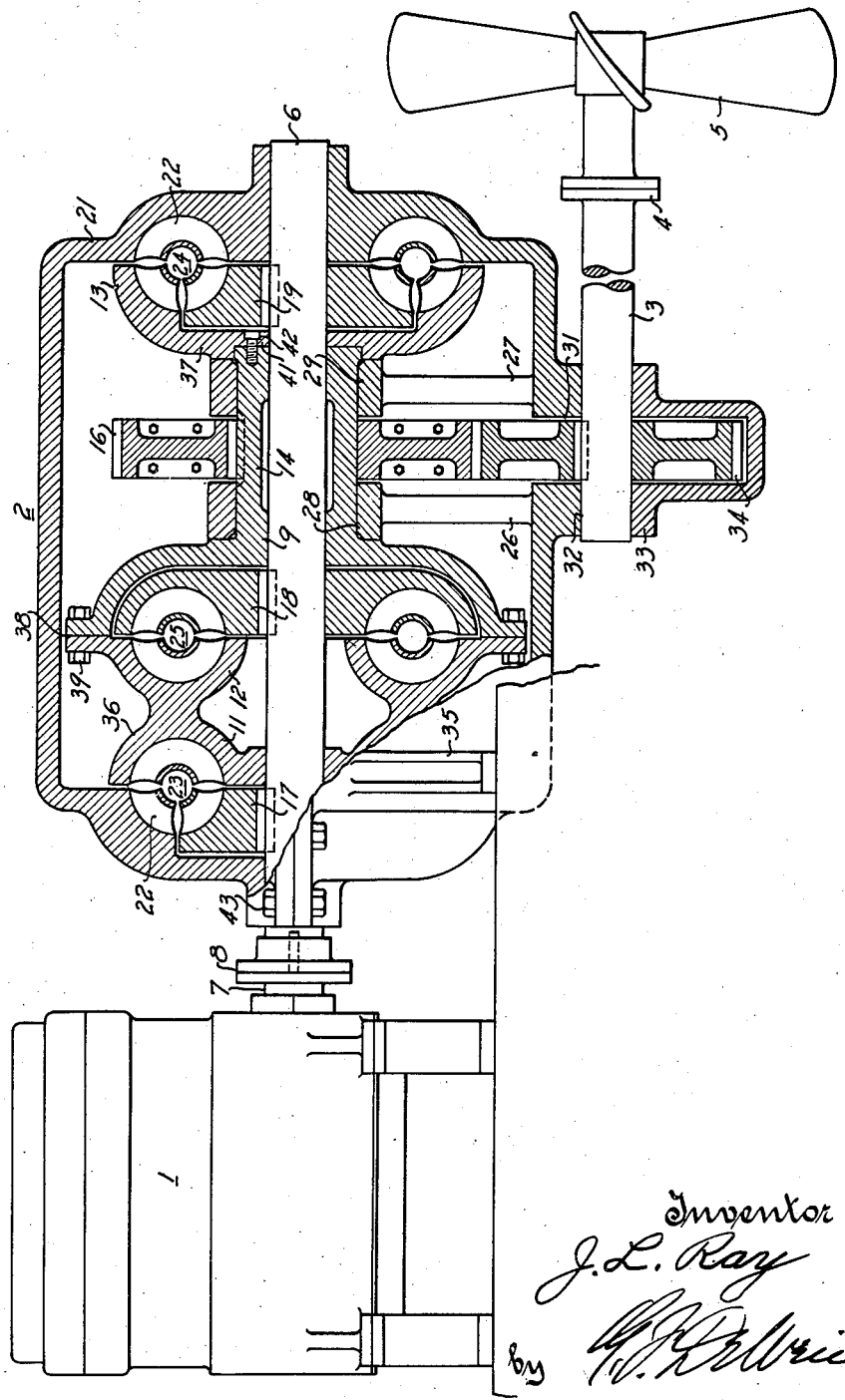

Patented Oct. 13, 1942

2,298,310

UNITED STATES PATENT OFFICE 2,298,310

HYDRAULIC DRIVE

James L. Ray, Elm Grove, Wis., assignor to Allis-Chalmers Manufacturing Company, Milwaukee, Wis., a corporation of Delaware Application April 20, 1940, Serial No. 330,711

4 Claims. (Cl. 60—54)

This invention relates to hydraulic drives and more particularly to hydraulic drives for propelling vehicles in which the speed and the direction of travel of the vehicle are subject to frequent changes.

An object of this invention is to provide an improved and simplified hydraulic drive.

Another object of this invention is to provide an improved hydraulic drive which is compact and which can be readily installed and serviced in a relatively small space.

Another object of this invention is to provide an improved hydraulic drive in that three hydraulic power transmission units, a power input shaft, and a power output shaft are so correlated that the power output shaft can be rotated in opposite directions and at different speeds without the use of lay shafts.

A further object of this invention is to provide an improved hydraulic drive which is durable and which can be manufactured, installed and serviced with minimum cost.

The invention accordingly consists of the various features of construction, combinations of elements and arrangements of parts as more fully pointed out in the appended claims and in the detailed description, in which the drawing shows a side view, partly in section, of a marine type drive embodying the invention.

Referring to the drawing, it is seen that the illustrated marine drive comprises a prime mover 1, a hydraulic power transmitting means 2, and a driven shaft 3 which may include one or more flexible couplings 4 and on which is mounted the propeller 5.

The hydraulic power transmitting means 2 comprises a shaft 6 which is connected with the shaft 7 of the prime mover 1 by means of a removable coupling 8, a tubular member 9 which is rotatably mounted on the shaft 6 and which includes three axially spaced annular fluid driven bladed elements 11, 12 and 13 and an intermediate portion 14 on which is mounted the split gear 16, three annular fluid impelling bladed elements 17, 18 and 19 which are secured to the shaft 6 in coacting relation with respect to the fluid driven elements 11, 12 and 13 on the tubular member 9, and a separable casing 21 enclosing the tubular member 9 and the adjacent portions of the shaft 6 which are provided with the fluid impelling elements 17, 18 and 19.

The interior end surfaces of the casing 21 are provided with an annular ring of stationary guide vanes 22 arranged to coact with the pairs of annular fluid impelling and fluid driven bladed elements 17, 11 and 19, 13, respectively, and form therewith axially spaced hydraulic torque converter units 23 and 24. The annular fluid impelling and fluid driven bladed elements 18 and 12, respectively, coact to form a hydraulic coupling unit 25. The interior of the lower portion of the casing 21 is provided with axially spaced bearing supporting brackets 26 and 27 arranged to extend inwardly adjacent the sides of the gear 16 and provide bearings 28 and 29 which coact with the intermediate portion 14 of the tubular member 9 so as to prevent lateral and longitudinal movements of the tubular member 9 with respect to the shaft 6. The casing 21 is provided with an opening 31 disposed opposite the gear 16 on the tubular member 9 and the exterior surface of said casing adjacent the opening 31 is provided with a shaft supporting bearing means 32. The bearing means 32 includes a removable cap and gear housing member 33. One end of the driven shaft 3 is rotatably mounted in the bearing means 32 and is provided with a gear 34 which extends through the opening 31 and meshes with the gear 16 on the tubular member 9. The outer portion of the gear 34 is enclosed by the bearing cap and gear housing member 33. The exterior surface of the lower portion of the casing 21 is provided with supporting brackets 35 which rest on a foundation or other suitable supporting means, as shown.

The tubular member 9 is preferably made in three separable portions or sections 14, 36 and 37. The intermediate portion 14 and the portion 36 are removably secured together as a unit by means of the coacting peripheral flanges 38 and the bolts 39. The intermediate portion 14 and the portion 37 are also removably secured together as a unit by means of an annular recess 41 in the portion 37 and the cap screws 42. The power transmission means 2 is assembled by placing the shaft 6 on suitable supports, the coupling 8 having been removed, and then sliding the fluid impelling member 18 onto the shaft from either end and securing it in the position shown by any suitable means such as keys. The next step is to mount the gear 16 on the intermediate portion 14, then secure the portion 37 to the portion 14 as previously described, and then slide this assembled structure onto said shaft from the right hand end thereof and into the position shown. The remaining procedure is to secure the fluid impelling element 19 on the shaft 6 in the position shown, then slide the portion 36 onto the opposite end of the shaft 6 and bolt the member 36 to the member 14, then secure the fluid impelling member 17 to the shaft 6 in the position shown, then place the thus assembled structure in the lower portion of the separable casing 21 with the gear 16 extending between the bearing brackets 26 and 27, and then place the upper portion of the casing 21 in place and removably secure the upper and lower portions of the casing together by any suitable means such as the bolts 43.

The stationary guide vanes 22 and the coacting annular fluid impelling and fluid driven bladed elements 17, 11 and 19, 13 of the torque converters 23 and 24, respectively, are so correlated that when the shaft 6 is rotating in a predetermined direction the admission of fluid to the torque converter 23 acts to effect a rotation of the tubular member 9 which is the opposite of that effected by the admission of fluid to the torque converter 24. The annular fluid impelling and fluid driven bladed elements 18 and 12 of the coupling 25 are so correlated that when the shaft 6 is rotating in said predetermined direction the admission of fluid to the coupling 25 acts to effect a rotation of the tubular member 9 in the same direction as that produced by the admission of fluid to the torque converter 24.

The power transmitting means is operated to vary the speed and the direction of rotation of the driven shaft by controlling the usual fluid circuits (not shown) for filling and emptying the hydraulic converter and coupling units. The torque converter 24 and the coupling 25 are used for propelling the ship in the ahead direction and in this connection the torque converter 24 is used for starting and for maximum power transmission throughout the low speed range and the coupling 25 is used for driving the ship throughout the high speed range. The converter 23 is used for propelling the ship in the astern direction as high astern speeds are not required. The use of torque converter and coupling units for propelling a vehicle in the ahead or forward direction is of particular importance with respect to land vehicles as it results in a material increase in the efficiency of the transmission and for further details in this connection, attention is directed to the United States patent to Gössler 2,142,269.

The invention is applicable for power transmission purposes generally and it should be understood that the marine drive shown and described is merely illustrative and that the driven shaft may be coupled with the driving axles of a land vehicle or with any other means to which it is desired to transmit power. In this connection, it should be also understood that the invention contemplates an arrangement of parts in which the shaft 3 is the power input shaft and the shaft 6 the driven shaft and that it is not intended to limit the invention to the exact mode of operation and details of construction herein shown and described as various modifications within the scope of the appended claims may occur to persons skilled in the art.

It is claimed and desired to secure by Letters Patent:

1. A hydraulic transmission for selectively rotating an element to be driven thereby in opposite directions comprising a rotatable power transmitting shaft, a tubular power transmitting member mounted on said shaft for rotation relative thereto and having an enlarged intermediate portion forming a chamber which surrounds said shaft, said tubular member having an annular series of blades on the interior of a portion of the wall of said enlarged portion and having an annular series of blades at each end thereof, an annular series of blades carried by the portion of said shaft within said chamber and by each portion of said shaft immediately adjacent the ends of said tubular member, a stationary casing enclosing said tubular member and the portions of said shaft immediately adjacent the ends of the said tubular member, an annular series of blades on each interior end portion of said casing adjacent the annular series of blades on the proximate end of said tubular member and on the proximate portion of said shaft, said annular series of blades being arranged to coact and form a pair of axially spaced torque converting units and an intermediate coupling unit each of which is operable to establish a fluid drive between said shaft and said tubular member, and said blades which coact to form said pair of torque converting units being so constructed and arranged that the fluid impelled element of one unit of said pair rotates in an opposite direction with respect to the fluid impelled element of the other unit of said pair.

2. A hydraulic transmission for selectively rotating an element to be driven thereby in opposite directions and at different speeds comprising a power transmitting shaft, means rotatably supporting said shaft, a tubular power transmitting member disposed in concentric relation with respect to said shaft and mounted for rotation relative thereto, said tubular member having at each end thereof an annular series of blades with the blades of one series facing away from and in the opposite direction with respect to the blades of the other series and having an enlarged intermediate portion providing a chamber which surrounds said shaft and which has on an interior wall portion thereof an annular series of blades facing away from and in the opposite direction with respect to the blades of one of said annular series of blades at the said ends thereof, an annular series of blades carried by the portion of said shaft within said chamber and by each portion of said shaft immediately adjacent the ends of said tubular member, and said annular series of blades being arranged to coact and form pairs of axially spaced fluid impelling and fluid impelled elements, and stationary guide vanes coacting with a pair of said elements so as to cause the fluid impelled element of said pair to rotate in an opposite direction with respect to the fluid impelled elements of the other pairs.

3. A hydraulic transmission for selectively rotating an element to be driven thereby in opposite directions and at different speeds comprising a power transmitting shaft, means rotatably supporting said shaft, a tubular power transmitting member disposed in concentric relation with respect to said shaft and mounted for rotation relative thereto, said tubular member having at each end thereof an annular series of blades with the blades of one series facing away from and in the opposite direction with respect to the blades of the other series and having an enlarged intermediate portion providing a chamber which surrounds said shaft and which has on a wall portion thereof an annular series of blades facing away from and in the opposite direction with respect to the blades of one of said annular series of blades at the said ends thereof, an annular series of blades carried by the portion of said shaft within said chamber and by each portion of said shaft immediately adjacent the ends of said tubular member, said annular series of blades being arranged to coact and form pairs of axially spaced fluid impelling and fluid impelled elements with the fluid impelled element of one pair arranged to rotate in an opposite direction with respect to the fluid impelled elements of the other pairs, a stationary casing enclosing said tubular member and the portions of said shaft adjacent the ends of the said tubular member, and an annular series of blades carried on each interior end portion of said casing in operative relation with respect to the adjacent pair of said fluid elements.

4. A hydraulic transmission for selectively rotating an element to be driven thereby in opposite directions and at different speeds comprising a power transmitting shaft, means rotatably supporting said shaft, a tubular power transmitting member disposed in concentric relation with respect to said shaft and mounted for rotation relative thereto, said tubular member having at each end thereof an annular series of blades with the blades of one series facing away from and in the opposite direction with respect to the blades of the other series and having an enlarged intermediate portion providing a chamber which surrounds said shaft and which has on an interior wall portion thereof an annular series of blades, an annular series of blades carried by the portion of said shaft within said chamber and by each portion of said shaft immediately adjacent the ends of said tubular member, said annular series of blades being arranged to coact and form pairs of axially spaced fluid impelling and fluid impelled elements, and stationary guide vanes coacting with a pair of said elements so as to cause the fluid impelled element thereof to rotate in an opposite direction with respect to the fluid impelled elements of the other pairs.

JAMES L. RAY.